US008755745B2

(12) United States Patent
Gandolfo

(10) Patent No.: US 8,755,745 B2
(45) Date of Patent: Jun. 17, 2014

(54) MODULAR, RECONFIGURABLE AND COGNITIVE MICROSYSTEM FOR THE MONITORING AND REMOTE CONTROL OF SMART COMMUNICATING OBJECTS

(76) Inventor: Pierre T. Gandolfo, Le Cannet (FR)

( * ) Notice: Subject to any disclaimer, the term of this patent is extended or adjusted under 35 U.S.C. 154(b) by 346 days.

(21) Appl. No.: 12/987,123

(22) Filed: Jan. 9, 2011

(65) Prior Publication Data
US 2011/0189956 A1   Aug. 4, 2011

(30) Foreign Application Priority Data
Feb. 2, 2010   (FR) ...................................... 10 00417

(51) Int. Cl.
*H04B 7/00*   (2006.01)
(52) U.S. Cl.
USPC .......................................................... 455/41.2
(58) Field of Classification Search
CPC ........................................................ H04B 7/00
USPC ...................................... 455/41.2, 41.1, 41.3
See application file for complete search history.

(56) References Cited

U.S. PATENT DOCUMENTS

| | | | | | |
|---|---|---|---|---|---|
| 7,750,759 | B1 * | 7/2010 | Lee et al. | ........................ | 333/186 |
| 7,769,372 | B1 * | 8/2010 | Wong | ............................ | 455/423 |
| 2007/0093225 | A1 * | 4/2007 | Murakami et al. | .......... | 455/252.1 |
| 2009/0154597 | A1 * | 6/2009 | Pan | ................................. | 375/303 |
| 2010/0111033 | A1 * | 5/2010 | Erceg et al. | .................... | 370/331 |
| 2010/0111052 | A1 * | 5/2010 | Erceg et al. | .................... | 370/338 |
| 2010/0225488 | A1 * | 9/2010 | Hinterlong | ................. | 340/573.4 |
| 2012/0057882 | A1 * | 3/2012 | Arahira | .......................... | 398/186 |
| 2013/0316759 | A1 * | 11/2013 | Hayem et al. | ............... | 455/552.1 |

* cited by examiner

*Primary Examiner* — Andrew Wendell
*Assistant Examiner* — Maryam Soltanzadeh

(57) ABSTRACT

The present invention is a modular, reconfigurable and cognitive Microsystem that dynamically adapts itself to a given radio context for an improved user experience and health risk detection while enabling the realization of custom telehealth products in a flexible and highly integrated manner. The Microsystem of the invention is made of one or several semiconductor dies, with complementary functionality, that are integrated both vertically and horizontally. By default, the Microsystem of the invention includes a 'base' die made of dual-mode and dynamically reconfigurable functional blocks implementing the whole 'Bluetooth Low Energy' standard and a portion of the 'Zigbee/IEEE 802.15.4' specification. The Microsystem according to the invention is particularly well-suited for the collection and transfer of (tele)health data but can also be applied to other application markets and devices having the need to support the operating modes, 'Bluetooth Low Energy' and/or 'Zigbee/IEEE 802.15.4', in a modular, reconfigurable and cognitive manner.

4 Claims, 3 Drawing Sheets

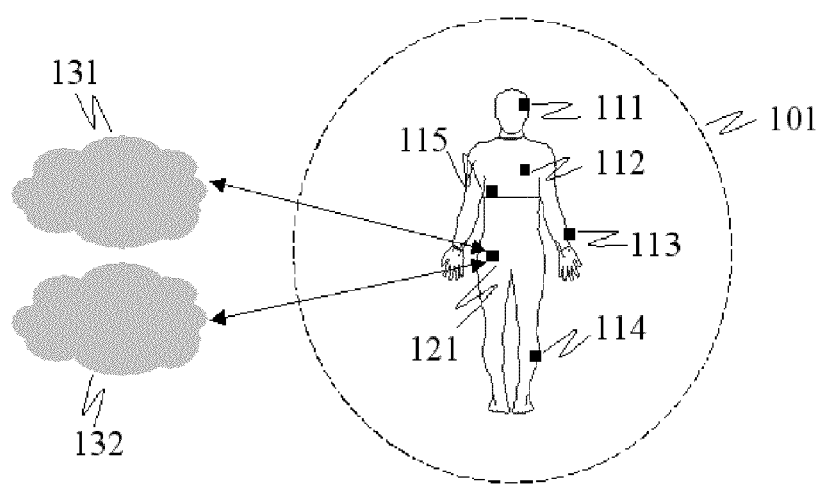
FIG. 1
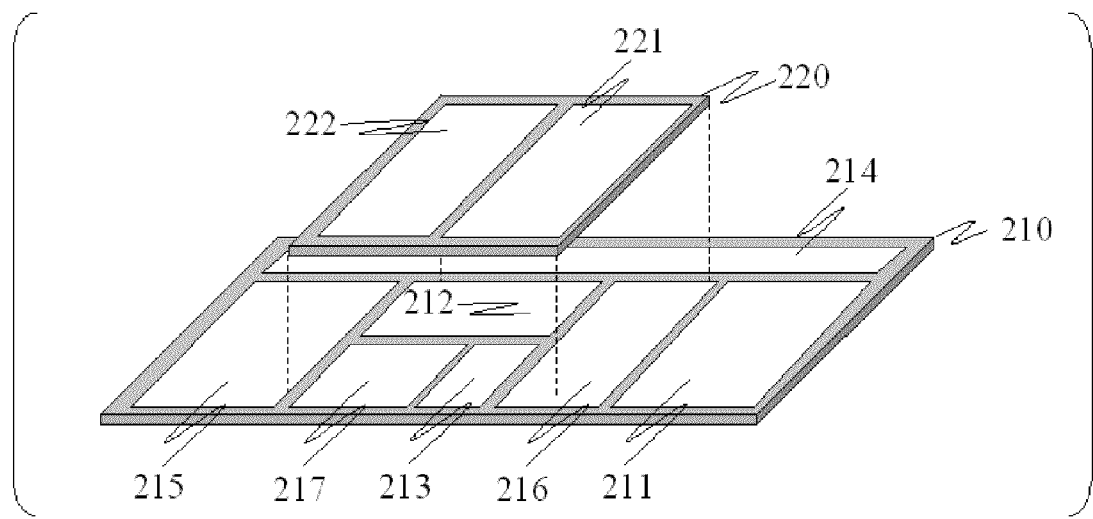
FIG. 2 (Front Page View)

MODULAR, RECONFIGURABLE AND COGNITIVE MICROSYSTEM FOR THE MONITORING AND REMOTE CONTROL OF SMART COMMUNICATING OBJECTS

CROSS-REFERENCE TO RELATED APPLICATIONS

The present document claims the benefits (i.e. foreign priority benefits) of the earlier filing date of commonly-owned French patent application Serial No. 1000417 filed on Feb. 2, 2010 through the INPI (Institut National de la Propriété Industrielle), and entitled "Microsystème modulaire, reconfigurable et cognitif pour la surveillance et le contrôle d'objets communicants à distance", the contents of which are incorporated by reference.

STATEMENT REGARDING FEDERALLY SPONSORED RESEARCH OR DEVELOPMENT

Non-applicable

REFERENCE TO SEQUENCE LISTING, A TABLE, OR A COMPUTER PROGRAM LISTING COMPACT DISC APPENDIX

Non-applicable.

BACKGROUND OF THE INVENTION

The present invention relates to the monitoring and remote control of smart communicating objects. More particularly, the present invention relates to Microsystems and methods for the collection and transfer of (tele)health data primarily.

Through the collection and regular transfer of physiological and other health-related data, telehealth helps improve the physical fitness and wellness of a human-being (i.e. sports/fitness), enables the diagnosis/monitoring of the condition of a patient(s) by a medical professional who is at a different location from the patient (i.e. acute/chronic disease management) and allows elderly people to remain living in their own home (i.e. ageing independently). As illustrated by FIG. 1, sensor devices (111-115) measure physiological and other health-related parameters (glucose level, pulse rate, electrocardiogram . . . ) and communicate their respective measurements to the coordinator-node (121) of the local network (101). The coordinator-node (121) assures the interface with one or several wider area networks (131-132) for a live consultation and/or for the storage and later treatment of the health data having been collected by the sensor devices (111-115) as well as for the configuration and software update of sensor devices by telehealth services providers.

Data exchange, between sensor devices (111-115) and the coordinator-node (121), are traditionally done through a wireless communication protocol such as 'Bluetooth Low Energy' for usage contexts requiring a high mobility (e.g. use while on the move), or 'Zigbee/IEEE 802.15.4' for usage contexts requiring less mobility but better robustness and network coverage (e.g. home use, use within fitness centre/assisted care facilities . . . ). The use of these two wireless communication standards currently causes several problems. First of all, even though those two wireless communication standards address usage contexts that are theoretically different, the lack of interoperability between those two standards may cause frustration to the end-user. Second, there are many applications and end-user scenarios (e.g. chronic disease management, sports/fitness and even ageing independently) that could benefit from the support of both standards. For instance, the electrocardiograph of a patient suffering from cardiac arrhythmia could continuously stream heart activity data, either through a 'Zigbee/IEEE 802.15.4' gateway or a 'Bluetooth Low Energy' enabled cell phone, depending on the availability of these two standards in a given time-space, thereby providing instant alerts and potentially saving lives as a result. As such, a dual-mode solution, capable of detecting and reconfiguring itself in function of a given radio context (i.e. 'Bluetooth Low Energy' or 'Zigbee/IEEE802.15.4'), would not only enhance the end-user experience by maximizing flexibility but also improves health risk detection.

Besides the fact of being mono-mode ('Bluetooth Low Energy' or 'Zigbee/IEEE 802.15.4'), current telehealth solutions do not dynamically adjust their radio performance level (radio sensitivity, linearity, filtering level . . . ) in function of propagation losses and interference level conditions at a given time. This static and over-dimensioned configuration results in an increase of the power consumption leading to battery life reduction for telehealth solutions.

Current Microsystems, which are the electronic components (i.e. integrated circuits/semiconductor chips) used in the fabrication of telehealth end products, also suffer from a lack of flexibility in order to address the multiple degrees of liberty to which telehealth products are subject: 'Bluetooth Low Energy' or 'Zigbee/IEEE 802.15.4' or dual-mode as a mean of wireless communication, selection of the power source (battery or thermal/kinetic/solar . . . energy scavenger), MEMS (Micro-Electro-Mechanical Systems) sensor type (e.g. pressure, accelerometer . . . ) to be used . . . . These multiples degrees of liberty lead to the development of a myriad of custom Microsystems but with low manufacturing volumes, thus resulting in increased development and manufacturing costs.

BRIEF SUMMARY OF THE INVENTION

Consistent with the title of this section, only a brief description of selected features of the present invention is now presented. A more complete description of the present invention is the subject of this entire document.

The modular, reconfigurable and cognitive Microsystem according to the invention enables to suppress all aforementioned drawbacks. A feature of the modular, reconfigurable and cognitive Microsystem according to the invention is that it is made of one or several semiconductor dies (alias modules) that are integrated both vertically and horizontally with, at a minimum, either a 'base' semiconductor die or the tandem formed by a 'base' semiconductor die and a 'complementary' semiconductor die.

Another feature of the modular, reconfigurable and cognitive Microsystem according to the invention is that the 'base' die is a hybrid solution, which is primarily made of dual-mode and dynamically reconfigurable functional blocks implementing the whole 'Bluetooth Low Energy' standard and a portion of the 'Zigbee/IEEE 802.15.4' specification. Another feature of the modular, reconfigurable and cognitive Microsystem according to the invention is that the 'complementary' die implements the remaining functional blocks for the realization of a complete 'Zigbee/IEEE 802.15.4' solution.

In other embodiments of the present invention, the modular, reconfigurable and cognitive Microsystem according to the invention may further include a 'sensor' die and/or a 'power' die and/or a 'passives' die in addition to the 'base' die or to the tandem formed by the 'base' die and the 'complementary' die. The 'sensor' die and 'power' die respectively implement the type of MEMS (Micro-Electro-Mechanical Systems) sensor and energy scavenger (solar, thermal, kinetic . . . ) and/or energy conditioning/storage having been selected for a given implementation while the 'passives' die includes RLC components (resistances, inductances, capacitors . . . ). This modular and reconfigurable approach will not only allow to realize custom telehealth end products in a cost-effective and flexible manner but also to jointly and dynamically support different wireless communication protocols ('Bluetooth Low Energy' and 'Zigbee/IEEE 802.15.4') if/when desired.

Another feature of the modular, reconfigurable and cognitive Microsystem according to the invention is that it uses a cognitive radio receiver capable of dynamically adapting itself to time-changing propagation losses and interference level conditions. That is, the power consumption of several functional blocks of the radio receiver will be optimized at any given point in time in function of the ambient radio frequency context, thereby improving the battery life of the telehealth node accordingly and the user experience by the same token.

As such, the modular, reconfigurable and cognitive Microsystem according to the invention is particularly well-suited for the collection and transfer of (tele)health data but can also be used in other application markets such as universal remote controls for consumer electronics, PC and gaming Human Interface Devices/HID (mouse, joystick, keyboard . . . ), sports/digital watches, and any other device having the need to support the operating modes, 'Bluetooth Low Energy' and/or 'Zigbee/IEEE 802.15.4', in a modular, reconfigurable and cognitive manner.

BRIEF DESCRIPTION OF THE SEVERAL VIEWS OF THE DRAWING

A more complete appreciation of the present invention and many of the attendant advantages thereof will be readily obtained as the same becomes better understood by reference to the following detailed description when considered in connection with the accompanying drawings. In these drawings like reference numerals designate identical or corresponding parts throughout the several views.

FIG. 1 illustrates a local network for telehealth as well as its interface with one or several wider area networks through a coordinator-node;

FIG. 2 shows, in a three dimensional space, an exploded view drawing of an embodiment of the modular, reconfigurable and cognitive Microsystem according to the invention, being made of a 'base' die and a 'complementary' die;

DETAILED DESCRIPTION OF THE INVENTION

Figure 3A:
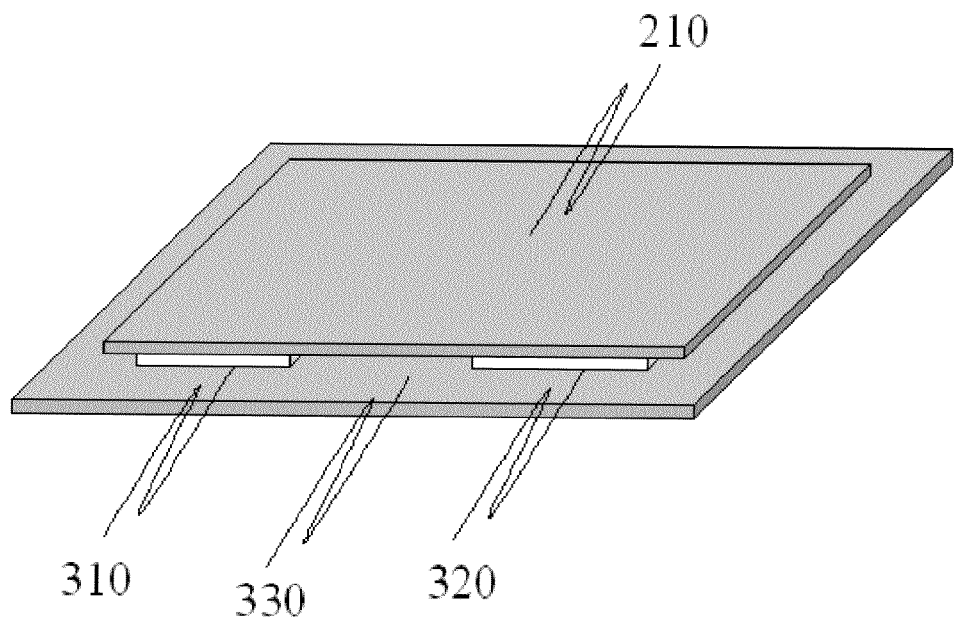
FIG. 3a illustrates, in a three dimensional space, another embodiment of the modular, reconfigurable and cognitive Microsystem according to the invention, being made of a 'base' die, a 'sensor' die, a 'passives' die and a 'power' die.

Referring to those drawings and more specifically to FIG. 2, the modular, reconfigurable and cognitive Microsystem according to the invention includes, by default, a 'base' die (210), which is primarily made of dual-mode functional blocks, that is of functional blocks that can be used either in a 'Bluetooth Low Energy' or 'Zigbee/IEEE 802.15.4' mode: a cognitive and reconfigurable transceiver (211) for wireless communication with one or several other device entities, a microcontroller (212) and associated RAM (Random Access Memories) memories (213) for the control of the different operating modes of the Microsystem and for some data processing, a power management unit (214) for the handling of the different power modes and for voltage regulation as well as a conditioning and acquisition block (215) for the processing and digitalization of signals coming from one or several sensors. Additionally, the 'base' die is also made of a 'Bluetooth Low Energy' hardware accelerator (216) for the processing of time-sensitive data, as well as a programmable and/or non-programmable program memory (217)—ROM (Read-Only Memory) and/or Flash-like. The program memory (217) contains the whole 'Bluetooth Low Energy' software stack as well as a Device Management Entity. The latter allows to control the different operating modes of the Microsystem, to manage the interface with sensor(s) and to dynamically reconfigure the Microsystem in either 'Bluetooth Low Energy' or 'Zigbee/IEEE 802.15.4' mode if/when a dual-mode version is supported.

The 'complementary' die (220) implements the remaining functional blocks for the realization of a complete 'Zigbee/IEEE 802.15.4' solution. The 'complementary' die is made of an IEEE 802.15.4 hardware accelerator (221) as well as a programmable and/or non-programmable program memory (222)—ROM and/or Flash-like—containing the whole 'Zigbee/IEEE 802.15.4' software stack. In a preferred embodiment of the present invention, three logical interfaces exist between the 'base' die (210) and the 'complementary' die (220): a first interface between the IEEE 802.15.4 hardware accelerator (221) and the cognitive and reconfigurable transceiver (211); a second interface between the IEEE 802.15.4 hardware accelerator (221) and the microcontroller (212); and a third interface between the program memory (222)—ROM and/or Flash-like—containing the whole 'Zigbee/IEEE 802.15.4' software stack and the microcontroller (212). In the embodiments of the present invention shown in FIGS. 3a and 3b, the modular, reconfigurable and cognitive Microsystem according to the invention further includes a 'sensor' die (310), a 'passives' die (320) and a 'power' die (330) in addition to the 'base' die (210) or to the tandem formed by the 'base' die (210) and the 'complementary' die (220). The 'sensor' die (310) and 'power' die (330) respectively implement the type of MEMS sensor and energy scavenger (solar, thermal, kinetic . . . ) and/or energy conditioning/storage having been selected for a given implementation while the 'passives' die (320) includes RLC components (resistances, inductances, capacitors . . . ).

Figure 3B:
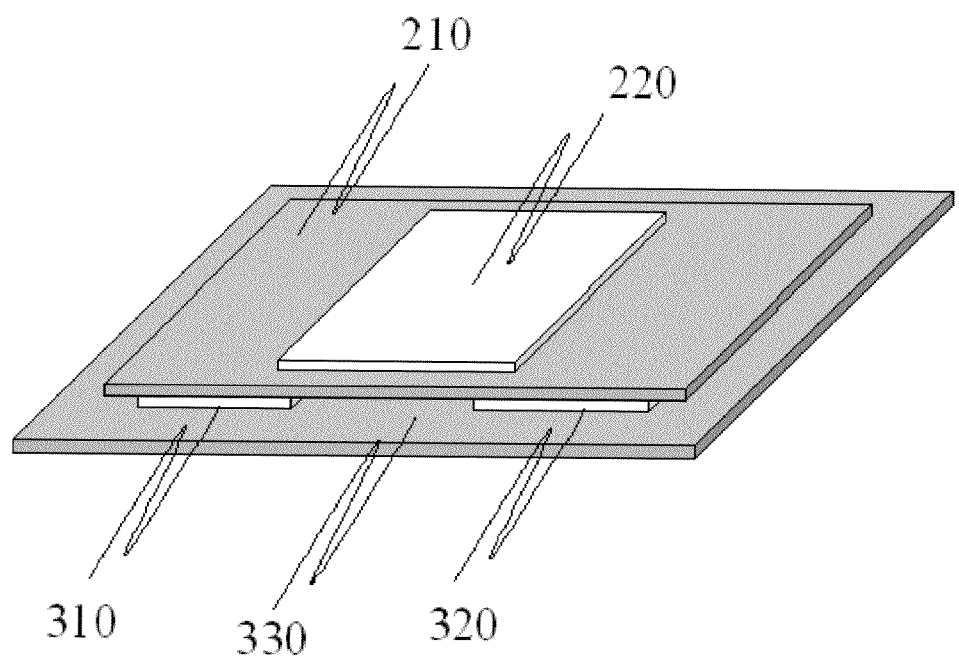
FIG. 3b illustrates, in a three dimensional space, another embodiment of the modular, reconfigurable and cognitive Microsystem according to the invention, being made of the tandem formed by a 'base' die and a 'complementary' die, as well as a 'sensor' die, a 'passives' die and a 'power' die.
Figure 4:
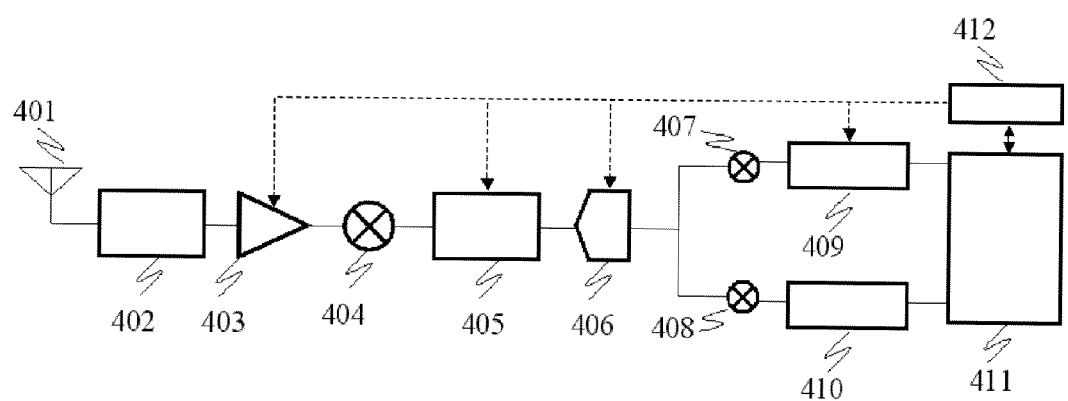
FIG. 4 is a block diagram of the cognitive and reconfigurable radio receiver.

Although the modular, reconfigurable and cognitive Microsystems shown in FIGS. 3a and 3b respectively integrate, both vertically and horizontally, four and five semiconductor dies, alternate embodiments can integrate fewer or more semiconductor dies. For instance and according to non-illustrated embodiments of the present invention, a mono-mode modular, reconfigurable and cognitive Microsystem, compliant with the 'Bluetooth Low Energy' standard, will be made of one to 4 dies (a 'base' die (210), by default, plus optionally a 'sensor' die (310) and/or a 'power' die (330) and/or 'passives' die (320)) whereas a mono-mode 'Zigbee/IEEE 802.15.4' or dual-mode modular, reconfigurable and cognitive Microsystem will be made of two to five dies (a 'base' die (210) and a 'complementary' die (220), by default, plus optionally a 'sensor' die (310) and/or a 'power' die (330) and/or 'passives' die (320)). As such, numerous modifications and variations of the present invention are possible in light of the above teachings. It is therefore to be understood that within the scope of the appended claims, the invention may be practiced otherwise than as specifically described herein.

FIG. 4 is a block diagram of the radio receive chain of the reconfigurable and cognitive transceiver (211) of the 'base' die (210). This reconfigurable and cognitive radio receiver works by sub-sampling the intermediary frequency. After being filtered by a RF band-pass filter (402) and amplified by a low noise amplifier/LNA (403), the input signal, coming from the antenna (401) is downconverted to an intermediary frequency (IF) by a mixer (404) before being filtered by an IF band-pass filter (405) and sub-sampled by an analog to digital converter/ADC (406). The signal is then processed digitally where it is first centered at DC by two numerical mixers (407 and 408) in phase quadrature so that the real and imaginary parts get extracted, before being filtered by low-pass filters (409 and 410) and finally demodulated by the demodulator block (411). The technical characteristics of several radio receiver functional blocks are dynamically adjusted by the Radio-Reconfigurator Entity (412) in function of RF propagation and interference level conditions. Those conditions are estimated by analyzing the received signal strength and received bit/packet error rates. The adjustable technical characteristics and associated radio receiver functional blocks are at least: gain, linearity and noise figure for the low noise amplifier/LNA (403); the roll-off factor/sharpness and bandwidth for the IF band-pass filter (405) and low-pass filters (409 and 410); the bit resolution and sampling frequency for the analog to digital converter/ADC (406).

In addition to optimizing the power consumption and robustness of the radio receive chain in function of a given radio frequency context, the Radio-Reconfigurator Entity (412), which is generally but not necessarily placed under the control of the Device Management Entity, also handles the dynamic reconfiguration of the radio receiver and transmitter functional blocks for the alternated support of both operating modes ('Bluetooth Low Energy' et 'Zigbee/IEEE 802.15.4') if/when a dual-mode version is supported.

The invention claimed is:

1. A Microsystem comprising a semiconductor base die made of dual-mode functional blocks that can be used either in a Bluetooth Low Energy-compliant or Zigbee/IEEE 802.15.4-compliant mode with: a microcontroller and associated non-transitory RAM memories, a programmable and non-programmable non-transitory program memory-ROM and Flash-like, a power management unit and voltage regulators, a conditioning and acquisition block for the processing and digitization of signals coming from one or several sensors as well as a cognitive and reconfigurable transceiver, wherein the radio receive chain of the cognitive and reconfigurable transceiver is made of several functional blocks whose technical characteristics can be dynamically adjusted by a Radio-Reconfigurator Entity in function of RF propagation and interference level conditions, with: a low noise amplifier/LNA adjustable in terms of gain, linearity and noise figure; a pass-band filter and low-pass filters adjustable in terms of roll-off factor/sharpness and bandwidth; an analog to digital converter/ADC adjustable in terms of resolution and sampling frequency; and further comprising one or more semiconductor dies, integrated vertically and horizontally with the base die, with: a complerrientary semiconductor die implementing the remaining functional blocks for the realization of a complete Zigbee/IEEE 802. 15.4-compliant solution with: a IEEE 802.15.4-compliant hardware accelerator for the processing of time-sensitive data and a programmable and non-programmable non-transitory program memory-ROM and Flash-like-that contains the whole Zigbee/IEEE 802.15.4-compliant software stack, a sensor die implementing a MEMS (Micro-Electro-Mechanical Systems) sensor, and a power die implementing an energy scavenger and energy conditioning/storage, and a passives die implementing RLC components (resistances, inductances capacitors . . . ).

2. A Microsystem, as recited in claim 1, comprising three logical interfaces between the base die and the complementary die: a first interface between the IEEE 802.15.4-compliant hardware accelerator of the complementary die and the cognitive and reconfigurable transceiver of the base die; a second interface between the IEEE 802.15.4-compliant hardware accelerator of the complementary die and the microcontroller of the base die; and a third interface between the non-transitory program memory of the complementary die and the microcontroller of the base die.

3. A Microsystem, as recited in claim 1, wherein the base die non-transitory program memory contains the whole Bluetooth Low Energy-compliant software stack as well as a Device Management Entity allowing to control the different operating modes of the Microsystem, to manage the interface with the sensor(s) and to dynamically reconfigure the Microsystem in either Bluetooth Low Energy-compliant or Zigbee/IEEE 802.15.4-compliant mode.

4. A Microsystem, as recited in claim 3, wherein the Radio-Reconfigurator Entity also handles the dynamic reconfiguration of the functional blocks of the transmit and receive radio chains of the cognitive and reconfigurable transceiver for the alternated support of both operating modes (Bluetooth Low Energy-compliant and Zigbee/IEEE 802.15.4-compliant).

* * * * *